(12) United States Patent
Wotton

(10) Patent No.: US 6,802,715 B1
(45) Date of Patent: Oct. 12, 2004

(54) PAINT TRAY ACTIVITY DESK

(75) Inventor: Michael Wotton, Plantsville, CT (US)

(73) Assignee: Polyconcept USA, Inc., Stamford, CT (US)

( * ) Notice: Subject to any disclaimer, the term of this patent is extended or adjusted under 35 U.S.C. 154(b) by 0 days.

(21) Appl. No.: 10/650,320

(22) Filed: Aug. 28, 2003

(51) Int. Cl.[7] .......................... G09B 11/00; G09B 11/10; B05C 17/00; B44D 3/00

(52) U.S. Cl. ............................ 434/81; 434/84; 434/85; 206/1.7; 206/1.8; 206/81; 206/575

(58) Field of Search ............................ 206/1.7, 1.8, 1.9, 206/205, 229, 362, 81, 575, 371, 214; 434/81, 84; 220/23.87, 528; 211/66; 297/135–173

(56) References Cited

U.S. PATENT DOCUMENTS

| | | | | |
|---|---|---|---|---|
| 2,515,703 A | * | 7/1950 | Dumas | 206/1.7 |
| 2,741,048 A | * | 4/1956 | Shelton | 206/1.7 |
| 3,426,888 A | * | 2/1969 | Meth | 206/1.8 |
| 3,786,913 A | * | 1/1974 | Crawford | 206/1.8 |
| 4,416,632 A | | 11/1983 | Berman | |
| 4,836,381 A | | 6/1989 | Edwards et al. | |
| 4,884,701 A | * | 12/1989 | Nymark et al. | 211/69.8 |
| 4,890,353 A | * | 1/1990 | Shannon et al. | 15/257.01 |
| 4,991,711 A | * | 2/1991 | Cheng | 206/1.7 |
| 5,097,967 A | * | 3/1992 | Sica | 211/66 |
| 5,242,496 A | * | 9/1993 | Handy | 118/52 |
| 5,257,721 A | * | 11/1993 | Smith et al. | 220/533 |
| 5,318,171 A | | 6/1994 | Szekely | |
| 5,325,958 A | * | 7/1994 | Arasim | 206/1.8 |
| 5,772,247 A | * | 6/1998 | Legrand | 281/31 |
| 5,860,518 A | | 1/1999 | Axelrod | |
| D477,843 S | | 7/2003 | Sieling | |

FOREIGN PATENT DOCUMENTS

FR 2604374 A1 * 4/1988 ............ B44D/3/12

* cited by examiner

Primary Examiner—Derris H. Banks
Assistant Examiner—Dmitry Suhol
(74) Attorney, Agent, or Firm—Notaro & Michalos P.C

(57) ABSTRACT

A paint activity tray has a first section with a workspace at least partly surrounded by a channel for holding excess water and a second section with recesses holding containers for water and watercolor paint blocks. A container with a handle holding paint brushes to drip dry is provided in one embodiment. The paint activity tray protects surrounding area from spills and drips since all of the components for making a watercolor painting are contiguous, and the containers for water and paint are securely held in recesses of the tray.

18 Claims, 6 Drawing Sheets

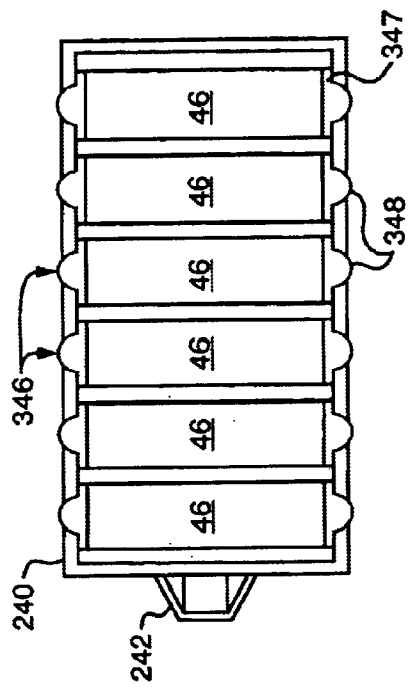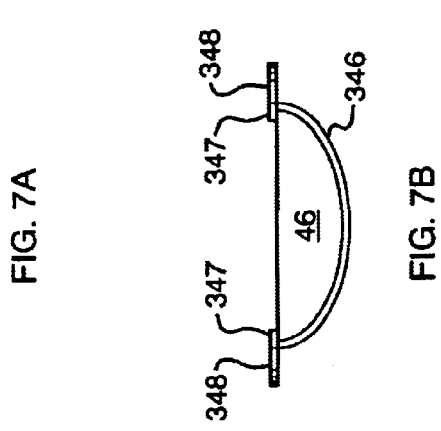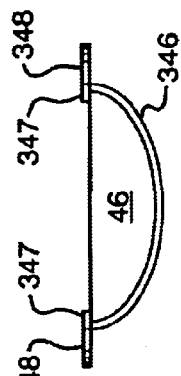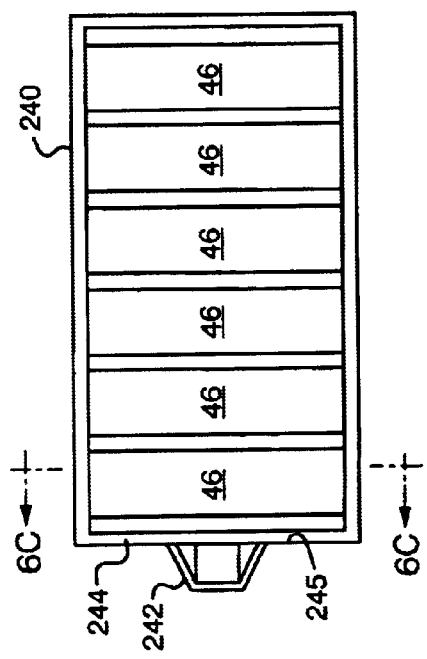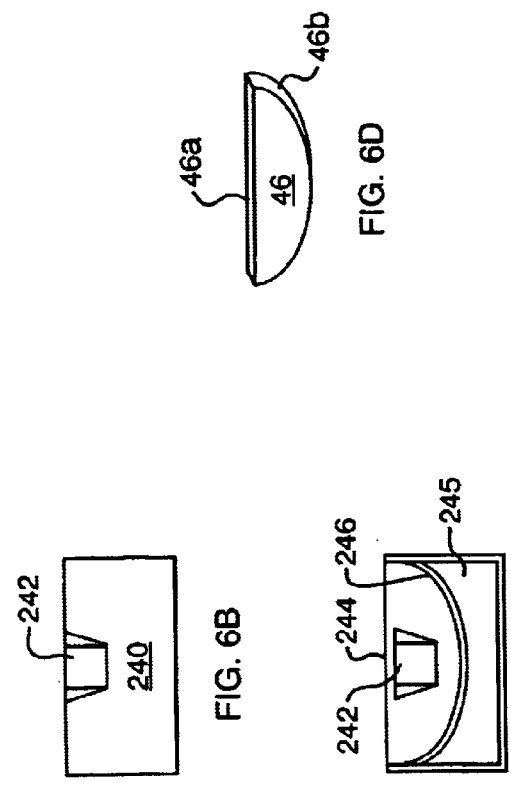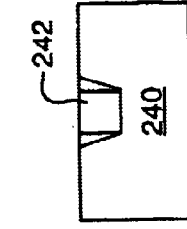

PAINT TRAY ACTIVITY DESK

FIELD AND BACKGROUND OF THE INVENTION

The present invention relates generally to the field of children's activity toys and in particular to a new and useful paint tray activity desk for reducing messes associated with paints and being easier to clean after use.

Watercolor paints are a source of enjoyment and creativity for children in particular. Watercolor paints are good for use by children because they usually do not require more than washing with water or wiping with a damp cloth to clean a child who deposits some of the paint on their body instead of a sheet of paper or other suitable substrate.

But, watercolors can still be messy. A cup or other container of water is usually needed to dip a brush in to both activate a watercolor paint pigment and clean brush for use with a different color. Thus, the container can be tipped and spilled, or drips will occur as the brush is moved from the water to the paints and to the substrate.

Activity toys or sets for children sometimes include paints. One known activity toy including paints is a paint-by-numbers kit. U.S. Pat. No. 4,416,632 describes one such paint-by-numbers kit having a plurality of paints in aligned recesses of a tray in combination with substrate bearing a line drawing picture. The tray includes a shelf with printed numbers on one side; each number identifies one of the paints. The picture has corresponding printed numbers indicating which one of the paints is used to color an area of the picture. A single brush is provided with the kit for depositing the paints on the picture. The tray includes two cradle holders extending from the shelf for holding the brush.

Paint-by-numbers kits like that of U.S. Pat. No. 4,416,632 do not include any support for the substrate bearing the line drawing picture. Further, as is usual for these kits, neither of the paint tray nor the water container disclosed by the patent include structure for catching water drips or spills. It is common to spread newspapers or other protective layers of paper below the substrate to prevent messes or damage from spilled paints.

Other painting toy sets simply include a tray of watercolor paint pigments in solid form within indentations on the tray. Some paint sets include a brush with the paint tray. To use the paints, the brush is wetted in water, and used to activate the pigments in one or more of the trays. Color is picked up on the brush, and used to paint on a sheet of paper or other substrate. The brush is cleaned by dipping in water. Typically, only one brush having a plurality of elongated bristles bound in a cylinder is provided in such paint sets.

U.S. Pat. No. 5,318,171 discloses a watercolor paint kit having several brushes of varying sizes, a paint block holder containing several blocks of paint pigment, and a water tray. The kit is provided as a case which can be folded closed for carrying. The brushes are provided for wetting on a cover sponge of the water tray, contacting one or more of the paint blocks to pick up color, and then making a painting on a suitable substrate. The brushes are formed from blades covered by a layer of foam. The brushes are sized so that a different number of the paint blocks is contacted at once by each of the brushes, thereby picking up one or multiple colors, depending on the brush width.

The kit of U.S. Pat. No. 5,318,171 does not include a substrate, or any area for holding a substrate, being painted. The paint blocks can be separated from the adhesive holding them in their respective slots for replacing, but the paint block holder and the water tray are both fixed in the kit and are not removable. Thus, to clean the holders in the kit, the entire case must be cleaned at once.

It is desirable to have an activity kit which includes a workspace that helps prevent water and paint from dripping or spilling onto other surfaces. No children's activity kits are known which include a mess prevention workspace or an easily cleaned workspace, as well as holders for paints, brushes and water.

SUMMARY OF THE INVENTION

It is an object of the present invention to provide a self-contained paint tray kit for reducing messes and making cleanup after use easier.

Yet another object of the invention is to provide a children's activity desk having a mess prevention workspace integrated with tool and material supply holders.

A further object of the invention is to provide an easily cleaned art activity desk having removable tool and supply holders combined with a workspace.

Another object of the invention is to provide a paint tray kit which forms a unitary work space area, but is easily separable into component parts for cleaning or storage.

Accordingly, a children's paint tray activity desk of the invention has a base tray with distinct areas for removable tool and supply holders, and a workspace. The workspace holds a piece of paper or other suitable substrate for applying watercolor paints to make a picture. The workspace is surrounded by a channel, or moat, inside the tray. The sides of the workspace are designed to permit excess water to naturally drain from the workspace into the channel. The workspace may be sloped slightly toward drain holes in the workspace sides to encourage water to drain into the channel.

The tool and supply holders include a water reservoir, a paint tray and a drip tray. Each of the tool and supply holders has a handle extending over the top with slots for receiving brushes, squeegees, rollers, sponge brushes, or other painting tools. One or more of the brushes, squeegees, rollers, sponge brushes or other tools are provided with the activity desk. The brush and tool handles may each have a groove for mating with the holder handle slots and making a more secure fit.

The base tray is preferably unitary, but may be separable into one section containing the removable tool and supply holders, and a second section with the workspace and surrounding channel. In this embodiment, the sections are preferably locked together during use to form a single activity desk. Separable embodiments of the base tray are more easily stored or carried on car trips while providing the same benefits of the unitary tray construction when assembled.

In an alternate configuration of the activity desk, only a paint holder and water supply reservoir are removably held in recesses in the base tray. A workspace is provided adjacent the paint holder and water reservoir recesses, with a channel around the front and one side of the workspace.

In a further alternate construction, the base tray has a ridged lip surrounding a flat, level workspace, but no drain. The ridged lip contains the excess water until the base tray is cleaned. The tool and supply holders may be supported in an integral portion of the base tray or a detachable second section.

Many different brushes and other paint applicators are available for use with the invention. Brushes include conventional bristle brushes, sponge brushes of different shapes and texture, squeegee brushes, or wiper blades, and rollers may all be used with the activity desk of the invention. The brushes are sized to have different widths, so that a varying number of colors of paint will be picked up when a wet brush is rubbed on the aligned paint blocks in the paint holder. For example, some brushes may be one paint block wide, while others may be two, three, four or more paint blocks wide.

The paint blocks of the invention are supported within the paint holder with the lower surface of the paint blocks held above the bottom of the paint holder. The spacing improves the life of the paint blocks, as excess water used to activate the paint blocks does not erode the block bottoms. The paint blocks are preferably removable from the paint holder for cleaning or rearranging the color order. The paint blocks are removably supported directly by the paint holder or are supported in individual cartridges removably connected with the paint holder.

When using wider brushes with the invention, a child can make rainbow type pictures with multiple colors at once on a paper held in the workspace. Plaid patterns are easily made using wider brushes to paint intersecting lines of multiple colors. At the same time, excess water is kept almost entirely within the confines of the activity desk by the base tray walls, the channel or moat around the workspace, and the contiguous water reservoir, paint holders and drip tray. The child has no need to pass the brush over any area other than the activity desk and its components.

Cleaning the activity desk is easy, as the water reservoir, paint holders and drip tray are all removable from the base tray, so that they can be emptied into a sink or other drain without having to lift the entire tray at once. Further, the paint blocks can be lifted from the paint holder to even more easily clean the paint holder and also extend the life of the paints. The components can be individually washed, if desired, and then replaced in their recesses in the tray.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 6A is a top plan view of a paint holder removed from the activity tray of FIG. 4;

FIG. 6B is an end elevation view of the paint holder of FIG. 6A;

FIG. 6C is a sectional end elevation view of the paint holder of FIG. 6A taken along line 6—6;

FIG. 6D is a front, top, right end perspective view of a paint block used with the invention FIG. 7A is a top plan view of the paint holder of FIG. 6A containing paint block cartridges;

FIG. 7B is a side elevation of a paint block cartridge shown in the paint holder of FIG. 7A;

DESCRIPTION OF THE PREFERRED EMBODIMENTS

Figure 1:
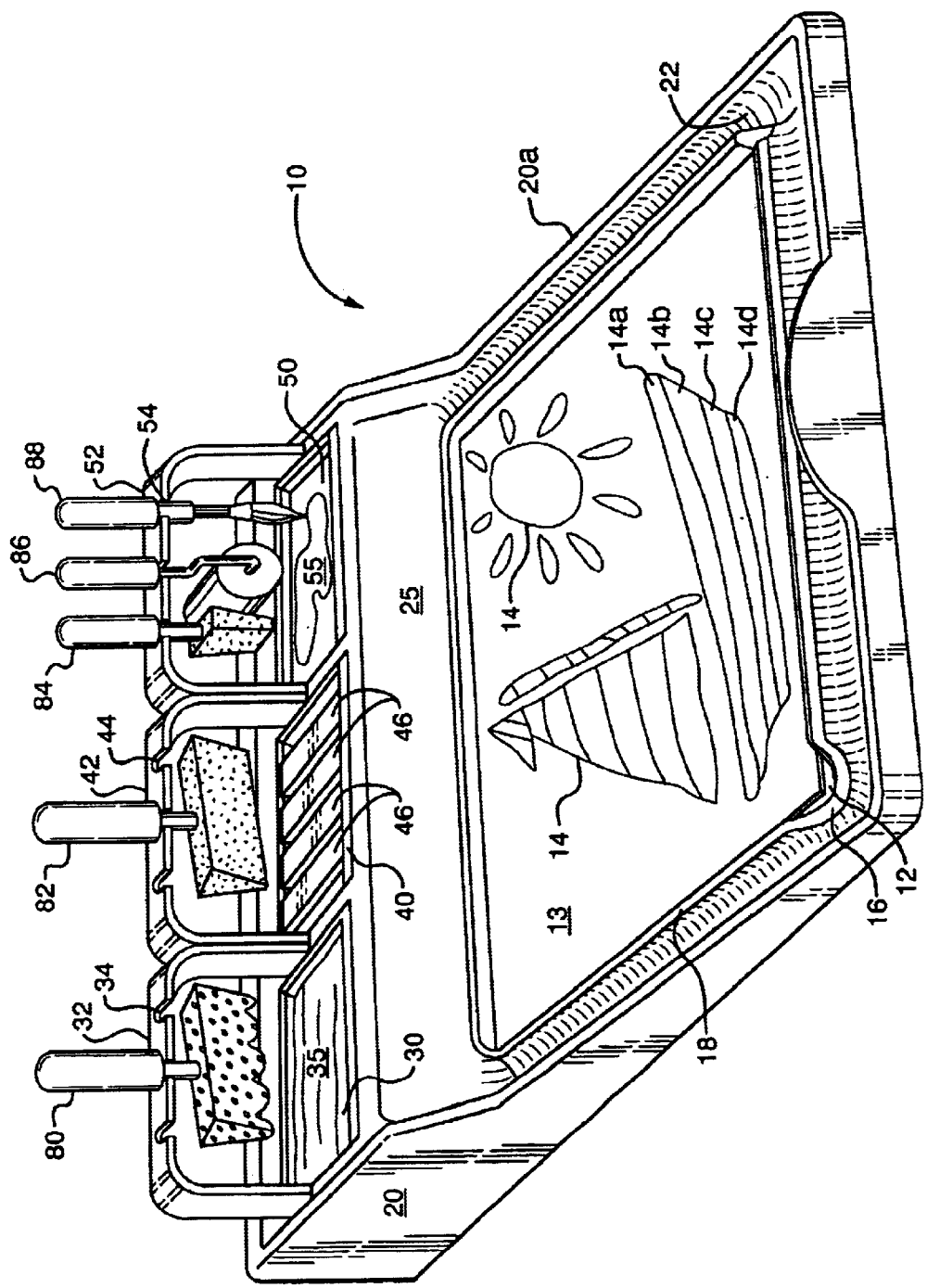
FIG. 1 is a top, front, left side perspective view of the activity tray of the invention.
Figure 2:
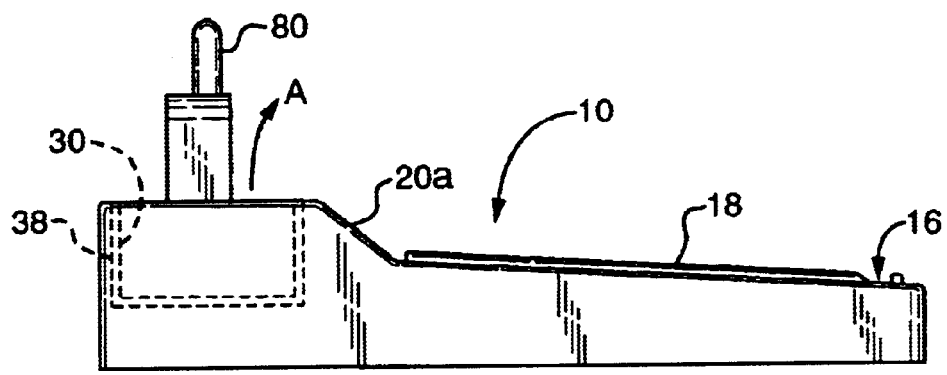
FIG. 2 is a side elevation view of the activity tray of FIG. 1.
Figure 3:
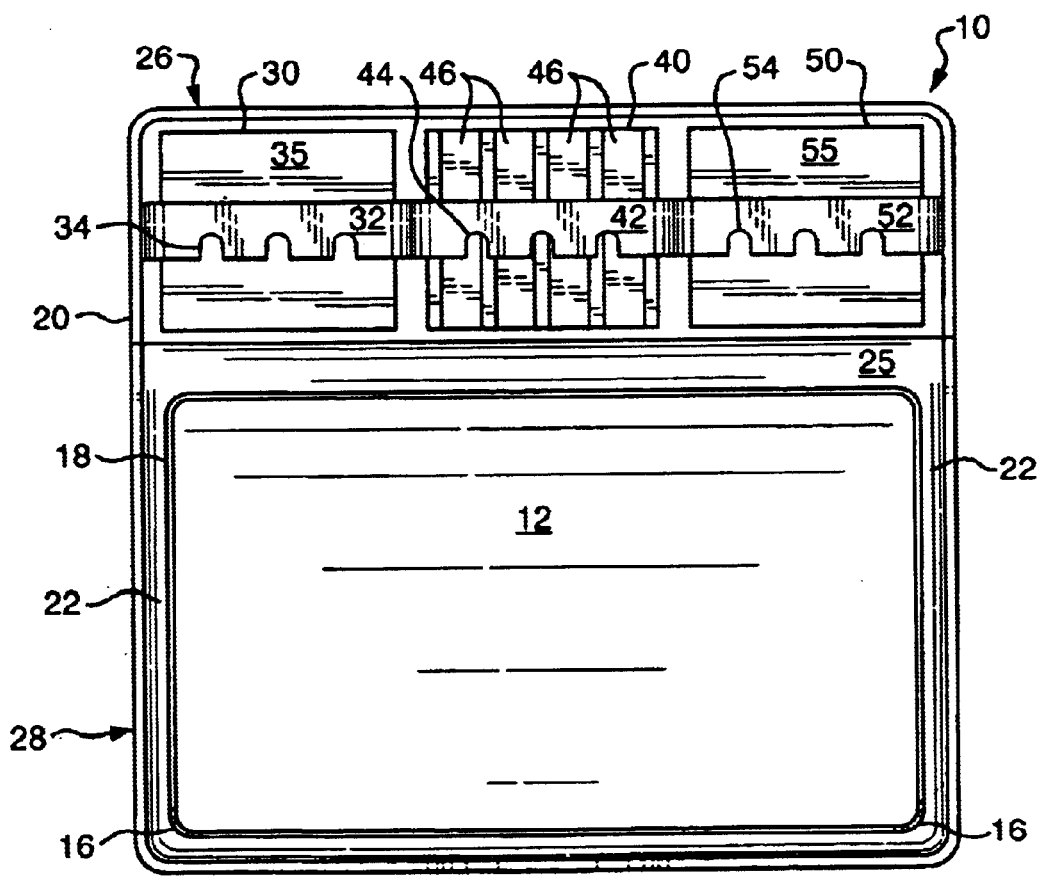
FIG. 3 is a top plan view of the activity tray of FIG. 1.

Referring now to the drawings, in which like reference numerals are used to refer to the same or similar elements, FIGS. 1–3 show an activity desk 10 of the invention having a base tray 20 with outside walls 20a surrounding a planar workspace 12 at a first or front section 28 and recesses for a water reservoir 30, a paint holder 40 and a drip tray 50 at a second or rear section 26 of the base tray 20. The outside walls 20a around the recesses and water reservoir 30, paint holder 40 and drip tray 50 at the rear section 26 are elevated above the recesses and the openings of their associated containers. The rear section 26 of the base tray 20 containing the recesses is elevated above the front section 28 with workspace 12, with dividing wall 25 between them. Dividing wall 25 may be sloped as shown, or a vertical wall.

The workspace 12 occupies a smaller area of the front section 28 than defined by the outside walls 20a. A workspace wall 18 with two drains 16 surrounds the workspace 12. A moat or channel 22 is formed all around the workspace 12 inside the base tray 20 between the workspace wall 18 and the area defined by the outside walls 20a and dividing wall 25.

The workspace 12 is elevated above the bottom of the channel 22, so that water or excess paint may drain from the workspace 12 to the channel 22 through drains 22. The channel 22 is preferably about 0.5 inches deep to ensure it will hold a reasonable amount of water before the channel 22 needs to be drained. Preferably, workspace 12 is slanted from back to front, as illustrated in FIG. 2, so that water or excess paint will tend to flow toward drains 16. Drains 16 are preferably areas where workspace wall 18 has no height, so that an opening at the same level as the workspace is formed. The workspace walls 18 may gradually slope down to the workspace 12 at the drains 16. Alternatively, the drains 16 can simply be slots in the workspace walls 18.

As illustrated in FIG. 1, a piece of paper or other substrate 13 is supported on the workspace 12 within the workspace wall 18. Preferably, the workspace 12 is sized to hold a standard letter size paper sheet measuring 8.5×11 inches; in such case a preferred size for the workspace 12 is 9×12 inches.

A child can then use the paint applicators 80, 82, 84, 86, 88 or others, as discussed further herein, to create designs 14 on the substrate 13 by applying paint from the paint holder 40. As discussed further herein, the paint holder contains several different color paint blocks 46 and a brush picks up multiple colors of paint from several blocks 46 at once. When such a brush is used to make the designs 14, a rainbow effect is produced, so that different color stripes 14a–14d are formed on the substrate 13, as displayed in FIG. 1.

Alternatively, a single color and smaller brush can be used to make the design 14.

As seen in FIGS. 1–3, the brushes and material supplies are held in the rear section 26 of the base tray 20. The water reservoir 30, paint holder 40 and drip tray 50 are preferably all removable from the recesses in which they are held. These containers are all removable for easier cleaning or dumping used water 55 and/or refilling with new water 35 or replacement paint blocks 46.

FIG. 2 illustrates in phantom how the water reservoir 30 fits into a recess 38 in the base tray 20. Arrow A indicates how water reservoir may be lifted out of the recess 38 for cleaning or filling. Handles 32, 42, 52 are well suited for removing the respective containers from their recesses.

Each of the water reservoir 30, paint holder 40 and drip tray 50 has a corresponding handle 32, 42, 52 with tool slots 34, 44, 54 for receiving one of the paint tools, or brushes, 80–88 shown in FIG. 1, among others.

Although the rear section 26 of the tray 20 is shown elevated, the water reservoir 30, paint holder 40, and drip tray 50 and rear section may all be at the same height as the workspace 12. The rear section is preferably elevated mainly to assist draining excess water and paint from the rear section into channel 22. And, while dividing wall 25 may be vertical, it is preferably sloped as shown, so that it is more easily used to press a brush against when washing color from the brush, and the water and paint will drain into the channel 22.

Water reservoir 30 is a container for either water 35, or a water absorbent sponge saturated with water 35. Water reservoir 30 is used to provide water 35 for picking up on the applicator of a brush 80–88, so that the brush can then be rubbed on paint blocks 46 to pick up color for painting. If the water 35 is used to saturate a sponge in the water reservoir 30, the sponge is preferable sized to have its top surface below the edge of the water reservoir 30.

Paint holder 40 includes a plurality of aligned paint blocks 46 supported in the holder 40 at the same height, so that the applicator of a brush can contact one or several of the paint blocks 46 at once. The paint blocks 46 are preferably spaced parallel inside the holder, slightly below the lip of the holder 40.

Drip tray 50 is preferably an open container with tools slots 54 overhead for supporting several brushes to drip dry. The dirty water 55 and paint which drips from the brushes is collected in the drip tray, rather than on surrounding surfaces or furniture where the desk is used.

As can be seen, the combination of the containers 30, 40, 50 and channel or moat 22 surrounding the workspace 12 combine to provide a mess-free activity desk 10 for a child. When the desk 10 is used, there is no need to drip wet brushes over any space except that occupied by the activity desk 10. The drip tray 50 is provided for holding used or inactive brushes, while the water reservoir 30 and paint holder 40 are contiguous with the workspace 12 holding the painted substrate. The contiguous nature of the containers 30, 40, 50 and workspace 12 ensure that surrounding surfaces and furniture are not marred or damaged by paint or dirty water. Further, as the containers 30, 40, 50 are held in recesses during use, and the channel 22 surrounding the workspace 12 is stable, spills are prevented as well.

In an alternate embodiment of the activity desk 200, a base tray 220 has a workspace in a first section 228 surrounded by a workspace wall 18 on all sides, except for drains 16. A channel 22 is formed at the front and one side of the workspace 12 only for receiving excess water and paint. A paint holder 240 and water reservoir 30 are provided in a second section 226 adjacent the channel 22 at the side of the workspace 12. The workspace wall 18 is immediately adjacent the outside wall 220a of the tray 220 at the top and one side.

The paint holder 240 and water reservoir 30 are each removable from recesses in the base tray 220. The water reservoir 30 is substantially the same as that used with base tray 20, and includes a handle 32 and tool slots 34. The paint holder 240 includes a spout 242 for draining excess water from within the paint holder after use. The paint holder 240 is shown and described in greater detail with reference to FIGS. 6A–7B, below.

Figure 4:
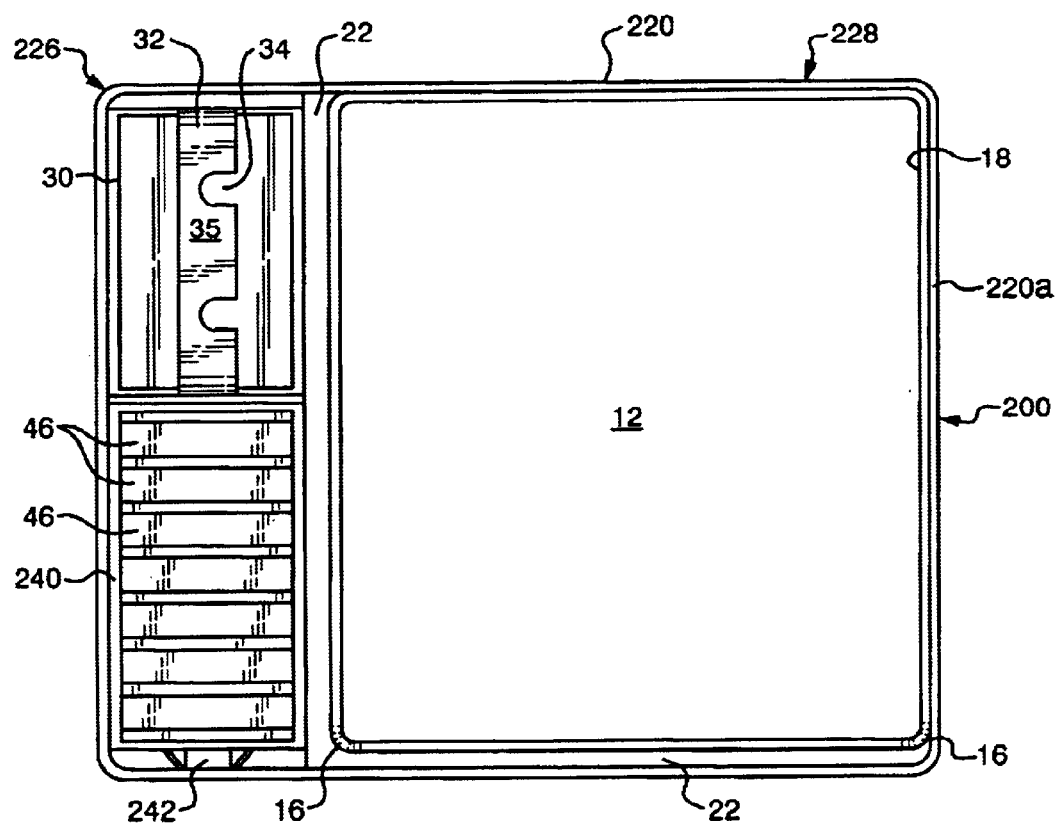
FIG. 4 is a top plan view of an alternate embodiment of the activity tray of the invention.
Figure 5:
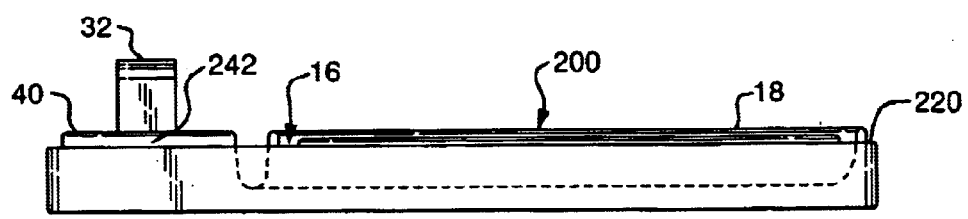
FIG. 5 is a side elevation view of the activity tray of FIG. 4.

FIGS. 6A–6D illustrate one embodiment of the paint holder 240 used with the portable activity desk 220 of FIGS. 4 and 5. As shown in FIGS. 6A–6C, the paint holder 240 has a plurality of paint blocks 46 extending transversely across the holder 240, and a spout 242 in one side wall 245. In the paint holder 240, the spout 242 is formed through the side wall 245, so that bar 244 extends over the spout opening, without blocking spout 242. The paint holder 240 includes block supports 246 for each paint block 46, as best illustrated in FIG. 6C. As illustrated, the block supports 246 are designed to hold a semi-circular or half-moon shape paint block 46. A half-moon shaped paint block 46 used with the paint holder 240 is illustrated in FIG. 6D. The block supports 246 are preferably spaced above the floor of the paint holder so that excess water used to activate the paints for taking up on a brush is held below the paint blocks 46. The spacing helps extend the life of the paint blocks 46 as the excess water is kept out of contact with the paint blocks 46.

As seen in FIG. 6D, paint block 46 has active surface 46a which is contacted by brush during use, and base surface 46b, which is supported by the paint holder 240. It should be understood that paint blocks 46 may take any shape which will extend across the paint holder 240, and can be formed simply as rectangular sticks, cylinders, or another polygonal shape. Preferably, however, at least the active surfaces 46a of the paint blocks 46 are planar, elongated rectangles.

The same paint block 46 shown in FIG. 6D may be used in the paint holder 40 of FIGS. 1–3. In such case paint holder 40 should have a suitable support (not shown) for holding each block 46. Further the paint blocks 46 are preferably removably secured inside the paint holder using any known means, such as adhesive tape, flexible clips or other mechanism. The securing mechanism used preferably is not easily operated by a child, so that the paint blocks will not be removed during play by a child.

FIGS. 7A and 7B show an alternate embodiment of the paint holder 240 supporting paint block cartridges 346. Each paint block cartridge 346 holds one paint block 46, such as shown in FIG. 6D. The paint block cartridges 346 have clips 347 and tabs 348 at each end. Tabs 348 rest over the top sides of the paint holder 240 and provide means for lifting the paint cartridges 346 from the paint holder 240. Clips 347 pass over the top surface 46a of paint blocks 46 and retain the paint block 46 in paint cartridge 346. Paint blocks 46 may be slidably inserted from the side to refill cartridge 346, and are frictionally held within the cartridge 346.

The paint cartridges 346 can be held on block supports 246 within the paint holder 240. Alternatively, the paint cartridges 346 can be supported by tabs 348 positioned over the edges of the paint holder 240 or in corresponding grooves (not shown) in the top edges of the paint holder 240. The paint cartridges 346 are more easily reconfigured within the paint holder 240, so that the order of paint block 46 colors can be easily switched by moving the paint cartridges 346. Similarly, a heavily used color paint block 46 is more easily replaced by simply inserting a new cartridge 346 or a new block 46 into an existing cartridge.

Some brushes 80, 82, 84, 85, 86, 88, 90 which are used with the invention are illustrated in FIGS. 1 and 8A–8D. It should be noted that while specific materials are disclosed, that any brush of any width up to the width of the paint holder 40 is acceptable for use with the invention, and the particular brushes disclosed are not intended to be limiting. Further, as used throughout herein, the term brush is intended to include any paint applicator that is suitable for use with the invention, including those illustrated in the drawings, such as bristle brushes, sponge brushes, squeegee or wiper blade applicators, and rollers.

Figure 8A:
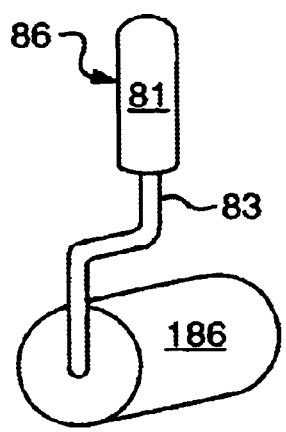
FIG. 8A is a front, left side perspective view of the roller brush illustrated with the activity tray of FIG. 1.
Figure 8B:
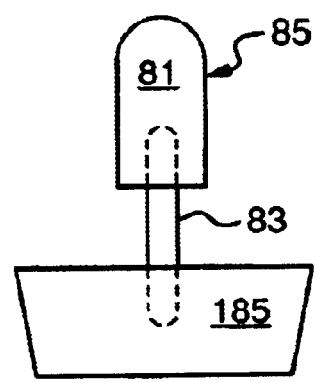
FIG. 8B is a front elevation view of a sponge brush for use with the invention.
Figure 8C:
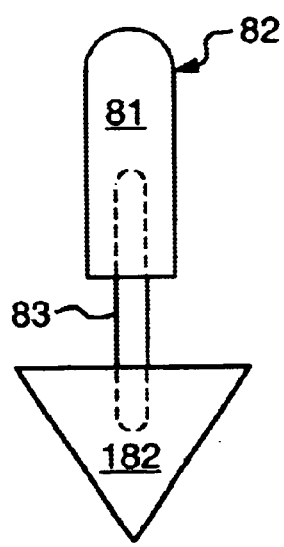
FIG. 8C is a side elevation view of a triangular sponge brush illustrated with the activity tray of FIG. 1.

As shown, the brushes 80–90 may have flat applicator surfaces 185, or they may be rounded like roller applicator 186, pointed like triangle sponge applicator 182 or wiper blade 192, or bristles like brush applicator 88. Each brush 80–90 preferably has a handle 81 connected to the applicator 182, 185, 186 by a bar or rod 83 inserted into each component as shown in FIGS. 8A–8C.

Figure 8D:
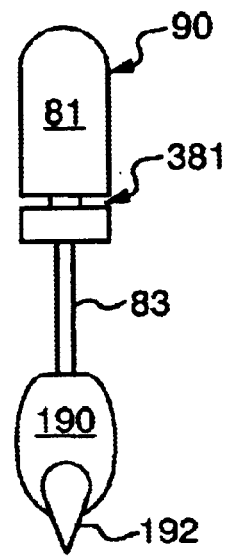
FIG. 8D is a side elevation view of a squeegee brush for use with the invention.

The wiper blade applicator 90 of FIG. 8D can be formed by handle 81 having connecting rod 83 secured to a blade holder 190 gripping wiper blade 192. The brushes can have continuous applicator edges, or they may be discontinuous, as with brush 80. The handle 81 of the applicator 90 is shown with groove 381. Groove 381 provides a section of handle 81 which is the same diameter as tool slots 34, 44, 54 of the handles 32, 42, 52. Groove 381 can be provided in the handle 81 of any of the brushes 80–90. The groove 381 provides an alternate point for inserting into the tool slots 34, 44, 54 to hold the brushes 80–90.

Figure 9:
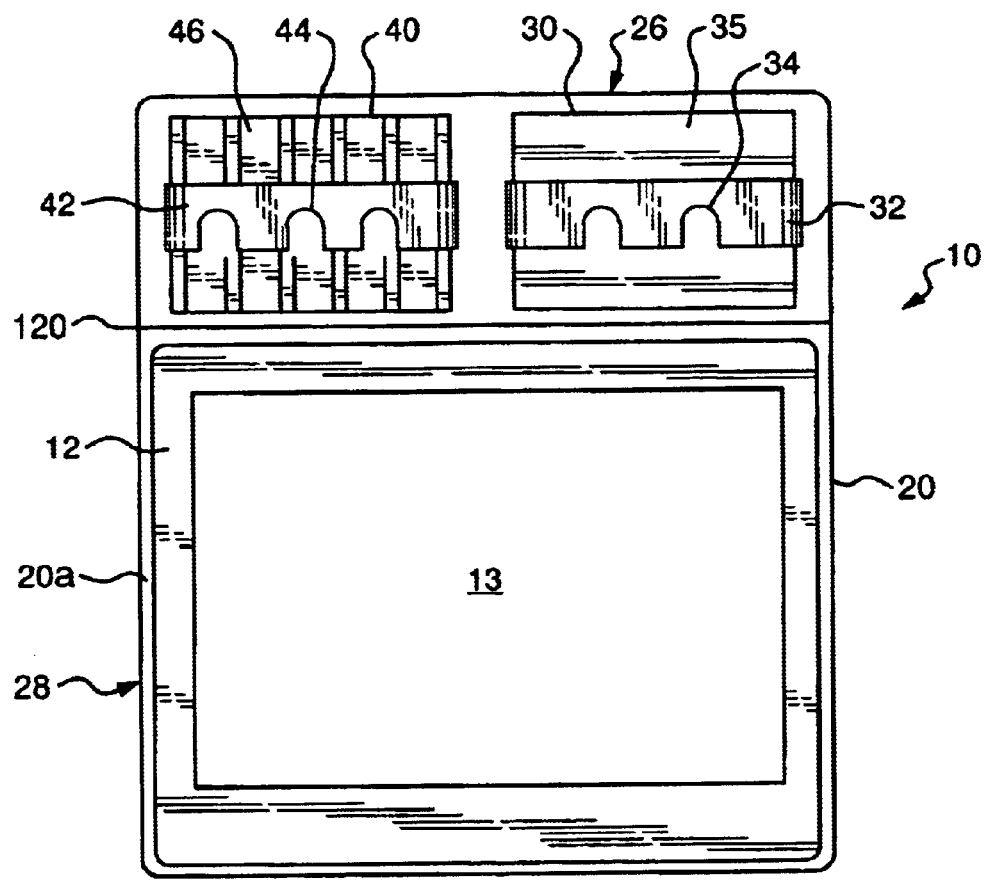
FIG. 9 is a top elevation view of a third embodiment of the activity tray of the invention.
Figure 10:
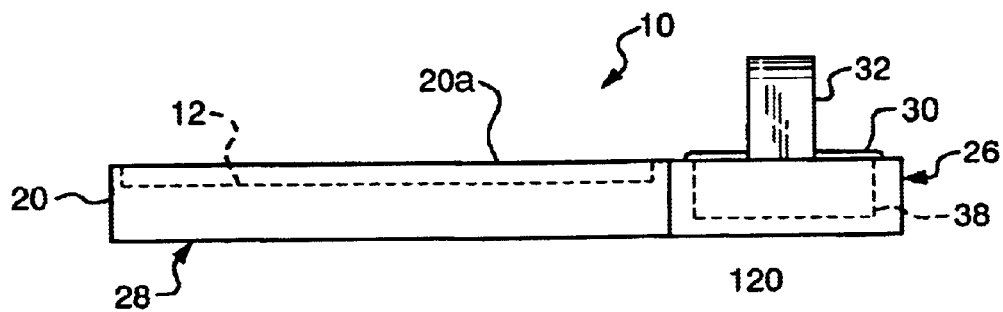
FIG. 10 is a side elevation view of activity tray of FIG. 9.

FIGS. 9 and 10 illustrate yet another embodiment for the base tray 20 of the activity desk 10. The base tray 20 has elevated outside wall 20a above workspace surface 12. Water reservoir 30 and paint holder 40 are held in recesses 38 in the rear section 26 of the tray 20.

Workspace 12 is planar and horizontal. A piece of paper 13 is supported on the workspace surface 12 for painting upon. Excess water from making a painting on the paper is held within the elevated outside walls 20a surrounding the workspace 12. Workspace 12 is sized so that it can hold a standard sheet of paper 13, while additional space remains for catching excess water and rubbing a brush to remove some paint.

Water reservoir 30 and paint holder 40 are about level with the elevated outside wall 20a of the base tray 20. The rear section 26 with water reservoir 30 and paint holder 40 is immediately adjacent the front section 28 of the base tray 20 with workspace 12. Thus, a brush can be dipped in water 35, rubbed on paint blocks 46 and applied to paper 13 without moving the brush outside of the activity desk 10, so that brushes carrying excess water or paint will not be dripped over furniture where the activity desk 10 is used.

The rear section 26 and front section 28 of the tray 20 may be separable, for more compact storage. Sections 26, 28 may be split along joint 120 of the tray 10 shown in FIGS. 9 and 10. In such case, simple connectors, such as hooks or tabs and corresponding slots can be used to join the sections 26, 28. Alternatively, sections 26, 28 may have complementary shapes and be press fit together along joint 120 for use, while remaining easily separable for cleaning or storage. And, in the case of the tray 10 illustrated in FIG. 1, the sections could be split at the top of dividing wall 25.

In each embodiment disclosed herein, the trays 20, 220, water reservoir 30, paint holders 40, 240 and drip tray 50 are all preferably made from vacuum formed plastic. But, any of these components may be made by plastic injection molding, or using other methods and materials as well. The bottom surface of the trays 20, 220 may be hollow and conform to the shape of the recesses, walls and workspace 12, depending on how they are formed, provided the trays 20, 220 will sit flat on a table or other surface.

While a specific embodiment of the invention has been shown and described in detail to illustrate the application of the principles of the invention, it will be understood that the invention may be embodied otherwise without departing from such principles.

What is claimed is:

1. An art activity desk for making watercolor paintings while reducing spills and drips during use, the desk comprising:

a base tray having a first section and a second section and an outside wall, the first and second sections being adjacent each other;

a planar workspace in the first section surrounded by a workspace wall having a drain, the workspace for supporting a substrate upon which a watercolor paint design is created;

a channel around at least a portion of the planar workspace between the workspace wall and the outside wall, the channel being in communication with the drain for receiving excess water from the workspace;

first and second recesses formed in the second section of the base tray a water reservoir containing a water supply, the water reservoir being removably held in the first recess;

a water reservoir handle extending over the water reservoir, the handle including at least one tool slot for receiving and holding a brush over the water reservoir; and a paint holder having a plurality of paint blocks removably held within the paint holder, the paint holder being removably held in the second recess.

2. An art activity desk according to claim 1, wherein the paint holder includes a paint holder handle extending over the paint holder, the paint holder handle having at least one tool slot.

3. An art activity desk according to claim 1, wherein the drain comprises two drains, one drain at each front corner of the workspace.

4. An art activity desk according to claim 1, wherein the workspace is sloped downwardly from back to front.

5. An art activity desk according to claim 1, further comprising a drip tray having a handle extending over the drip tray with at least one tool slot for receiving and holding a brush over the drip tray, the drip tray removably held in a third recess in the second section of the base tray.

6. An art activity desk according to claim 5, wherein the second section is elevated above a height of the first section.

7. An art activity desk according to claim 6, further comprising a dividing wall between the first and second sections.

8. An art activity desk according to claim 7, wherein the dividing wall is sloped downwardly from the second section to the first section.

9. An art activity desk according to claim 1, wherein the channel completely surrounds the workspace.

10. An art activity desk according to claim 1, wherein the base tray is one of vacuum formed from plastic and injection molded plastic.

11. An art activity desk according to claim 1, wherein the paint holder further comprises a drain spout.

12. An art activity desk according to claim 1, wherein the paint blocks are shaped one of semi-circular blocks, elongated rectangular bars and cylinders with a flattened surface.

13. An art activity desk according to claim 1, further comprising a plurality of brushes having applicators with widths ranging from one paint block wide to a width of the paint holder.

14. An art activity desk according to claim 13, wherein the plurality of brushes includes rollers, squeegees, sponge brushes and bristle brushes.

15. An art activity desk according to claim 1, further comprising a plurality of paint cartridges, each paint cartridge supporting one of the plurality of paint blocks in the paint holder, the plurality of paint cartridges being removable from the paint holder.

16. An art activity desk for making watercolor paintings while reducing spills and drips during use, the desk comprising:

a base tray having a first section and a second section, the first and second sections being adjacent each other;

a planar workspace in the first section, the workspace for supporting a substrate upon which a watercolor paint design is created;

an outside wall on the first section elevated above and surrounding the planar workspace;

first and second recesses formed in the second section of the base tray;

a water reservoir containing a water supply, the water reservoir being removably held in the first recess;

a water reservoir handle extending over the water reservoir, the handle including at least one tool slot for receiving and holding a brush over the water reservoir; and a paint holder having a plurality of paint blocks removably held within the paint holder, the paint holder being removably held in the second recess.

17. An art activity desk according to claim 16, further comprising a drip tray having a handle extending over the drip tray with at least one tool slot for receiving and holding a brush over the drip tray, the drip tray removably held in a third recess in the second section of the base tray.

18. An art activity desk according to claim 16, further comprising a plurality of paint cartridges, each paint cartridge supporting one of the plurality of paint blocks in the paint holder, the plurality of paint cartridges being removable from the paint holder.

* * * * *